July 8, 1958 S. B. RUPP ET AL 2,842,258
BEARING FOR AUGER CONVEYOR BUNK FEEDERS
Filed Nov. 5, 1956

INVENTORS
Sylvester B. Rupp
BY Lester P. Rupp

Sam J. Slotsky
ATTORNEY

United States Patent Office 2,842,258
Patented July 8, 1958

2,842,258

BEARING FOR AUGER CONVEYOR BUNK FEEDERS

Sylvester B. Rupp and Lester P. Rupp, Cleghorn, Iowa

Application November 5, 1956, Serial No. 620,240

1 Claim. (Cl. 198—213)

Our invention relates to a bunk feeder of the type having an auger conveyor therein.

An object of our invention is to provide a conveyor which will feed the feed material uniformly into the bunk and will distribute it uniformly laterally.

A further object of our invention is to provide means for adjustably positioning the conveyor in a certain type of bearing of our invention.

A further object of our invention is to provide a special bearing having certain characteristics which will allow functioning of the conveyor for a long time without wearing thereof.

Figure 1:
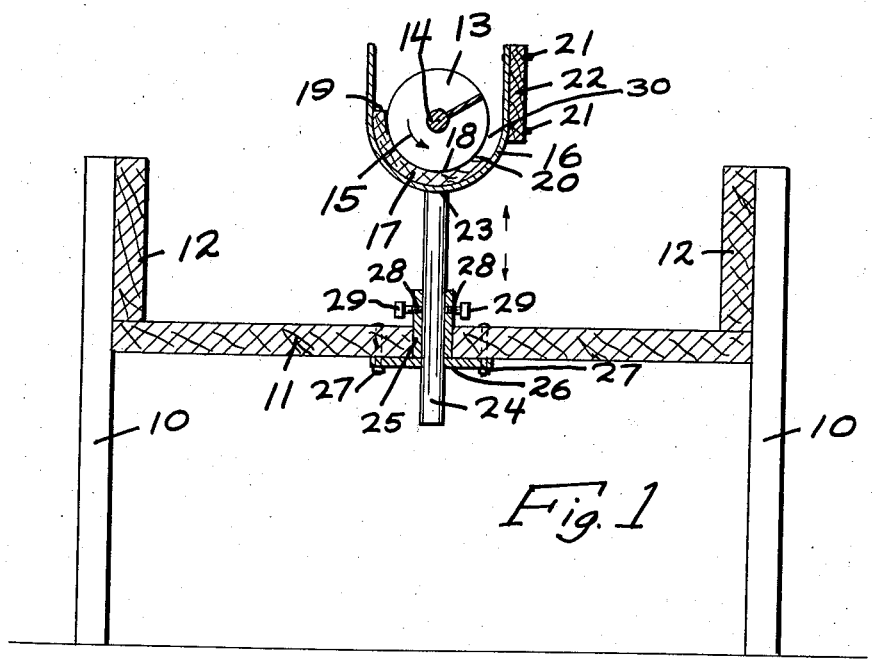
Figure 2:
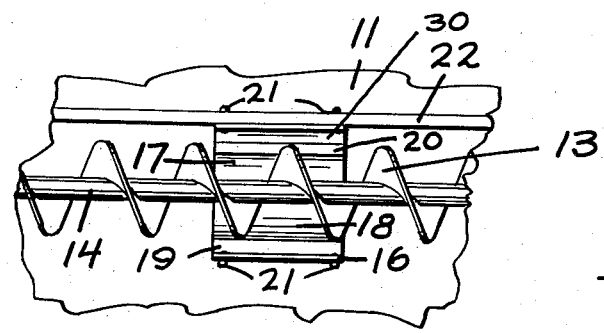

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

Figure 1 is a transverse section taken through the feeder bunk as well as our bearing, and Figure 2 is a plan view of a portion of Figure 1.

Our invention contemplates the provision principally of suitable bearings for securing and supporting helical auger conveyors.

We have used the character 10 to designate the vertically positioned legs which support the feeder bunk itself, the character 11 indicating the bottom wall of the bunk, the character 12 the side walls, the legs 10 being attached to the side walls 12, it being specifically understood that the feeder bunk is of a fairly considerable length so as to feed several stock animals, such bunks in many cases being forty-eight feet long or over, the helical conveyors therein being supported by the bearings about to be described at intervals of approximately eight feet.

We have used the character 13 to indicate the helical conveyor itself, having the shaft 14, which shaft can be driven by means of any suitable motor arrangement which is coupled to this shaft at the termination thereof, it being understood also that the feed to be brought into the bunk can be fed at one end preferably whereby it is then carried along by the helical conveyor 13. The conveyor travels in the direction of the arrow 15 and the bearings upon which the conveyor is supported include the substantially U-shaped members 16 made of metal or any other suitable material, and attached within the lower part of the member 16 is the arcuate wooden or other material member 17 which includes the arcuate portion 18 upon which the helical conveyor 13 rests as shown. The member 17 as stated above can be made of any material such as wood or the like which has good wearing qualities and yet will not injure the outer edges of the helical blade 13, and it will be noted that the upper edge 19 of the member 17 is substantially higher than the further edge 20.

Suitably attached at 21 to one side of the member 16 is the longitudinally extending board 22 which extends the entire length of the bunk feeder and is attached to each of the spaced bearing members.

Attached at 23 to the member 16 is the vertical post 24 which is received within the pipe member 25 having the flanged portion 26 which is bolted at 27 to the lower wall 11, and threadably engaging the pipe 25 at 28 are the oppositely positioned set screws 29.

It will be noted from the foregoing construction that the conveyor will convey the material longitudinally through the bunk and will thence allow the material to pass laterally to fill the outer inner portions of the bunk, the height of the conveyor more or less adjusting the height of the material, which height can thereby be adjusted by loosening the set screws 29 and re-tightening after the pipe 24 is adjusted to the desired height.

As the material is fed in the direction of the arrow 15 toward the board 22, this board will have the tendency of retarding a certain amount of the material which will then flow towards the left in Figure 1, the board thence tending to equalize the lateral distribution of the material. Since the upper edge of the member 17 at 20 is considerably lower than the other edge 19, a space will be provided at 30 in each individual bearing to allow the material to flow along the bearing and outwardly therefrom without choking the bearing.

The continual rotation of the auger conveyor 13 on the bearing surface at 18 will not unduly wear out the auger surface in any way due to the fact that the bearing material is relatively soft enough to prevent such wear.

It will now be seen that we have provided the various advantages mentioned in the objects of our invention with other advantages being readily apparent.

Some changes may be made in the construction and arrangement of the parts of our invention without departing from the real spirit and purpose of our invention, and it is our intention to cover by our claim any modified forms of structure or use of mechanical equivalents which may be reasonably included within its scope.

We claim as our invention:

A bunk feeder comprising a longitudinally extending auger conveyor positioned within said bunk feeder, a plurality of spaced bearings for supporting said auger conveyor, said bearings including substantially U-shaped supports, said supports including arcuate bearing pieces upon which said auger conveyor rests, said pieces being made of relatively softer material for preventing erosion of the peripheral portions of said auger conveyor, said bearing pieces being of substantial thickness, one upper edge of said bearing pieces being substantially higher than the other edge thereof, to provide an unrestricted space in said bearings as the lower portions of said auger conveyor rotate toward said unrestricted space, vertically positioned posts attached to said U-shaped supports, means for adjustably positioning said posts, including pipes secured to the horizontal floor portion of said bunk feeder, said posts being received in said pipes, set screws threadably engaging said pipes and abutting against said posts, a vertically positioned lengthened board being secured to all of said supports and to the side of said supports toward which the lower portions of said auger rotate, said board being adapted to equalize the lateral ejection of feed material passing from said auger conveyor.

References Cited in the file of this patent

UNITED STATES PATENTS

| | | |
|---|---|---|
| 2,395,410 | Kaesler | Feb. 26, 1946 |
| 2,528,679 | Ballard et al. | Nov. 7, 1950 |
| 2,569,812 | Hanna | Oct. 2, 1951 |
| 2,646,023 | Virgil | July 21, 1953 |